C. S. PEETS.
ALINEMENT DEVICE FOR AUTOMOBILES.
APPLICATION FILED MAR. 17, 1920.

1,374,028. Patented Apr. 5, 1921.

WITNESSES

INVENTOR
CLIFFORD S. PEETS,
BY
ATTORNEYS

UNITED STATES PATENT OFFICE.

CLIFFORD S. PEETS, OF GREAT NECK STATION, NEW YORK, ASSIGNOR TO CHARLES DILLON, OF GREAT NECK, NEW YORK.

ALINEMENT DEVICE FOR AUTOMOBILES.

1,374,028. Specification of Letters Patent. Patented Apr. 5, 1921.

Application filed March 17, 1920. Serial No. 366,509.

*To all whom it may concern:*

Be it known that I, CLIFFORD S. PEETS, a citizen of the United States, and a resident of Great Neck Station, in the county of Nassau and State of New York, have invented a new and Improved Alinement Device for Automobiles, of which the following is a full, clear, and exact description.

The invention relates to automobiles of the Ford type, and its object is to provide a new and improved alinement device for such automobiles, arranged to reduce sidewise swaying of the car body to a minimum.

Another object is to permit of readily applying the alinement device to the automobile without requiring changes in the construction thereof.

Another object is to provide an alinement device which is exceedingly simple and durable in construction.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1:
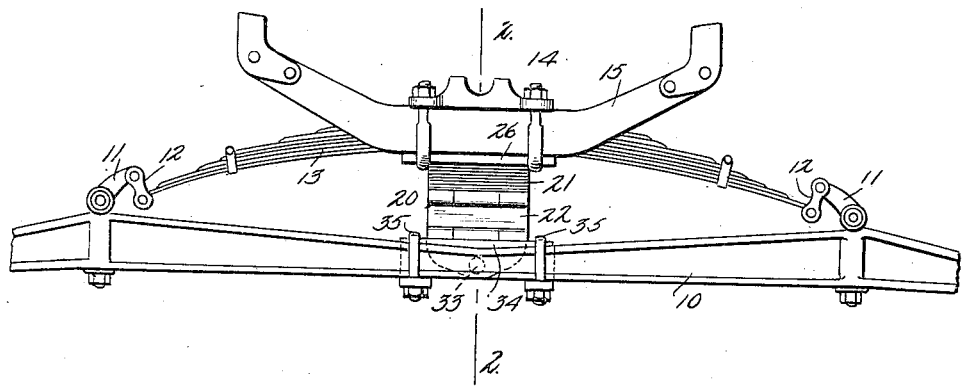
Figure 2:
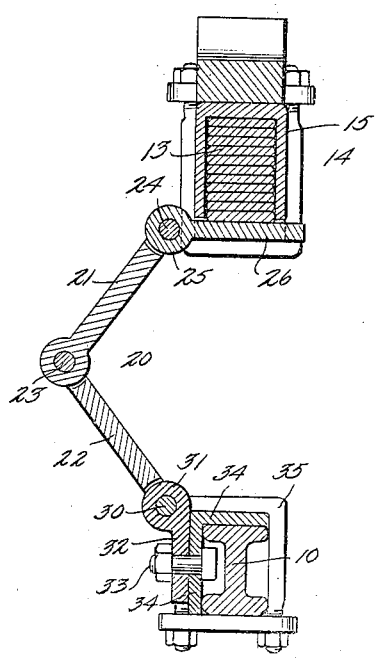

Figure 1 is a front elevation of the improved alinement device as applied to a Ford automobile; and Fig. 2 is an enlarged transverse section of the same on the line 2—2 of Fig. 1.

It is well known that the steering gear of the Ford car has characteristics and peculiarities not common to other automobiles. It is also well known that there is a feeling of springiness or give in the control of the steering wheel. In turning corners the front wheels have a tendency to turn at a sharper angle than intended by the operator. When traveling in sand, mud, or snow the Ford is more difficult to keep in a straight line than cars of another type. The cause of the above tendencies is due principally to the arrangement of the front spring, front radius rods, and the direction of the action of the steering arm at the lower end of the steering gear. To explain more in detail: the front spring is set crosswise of the chassis frame; it is clipped at the middle of the center of the front cross member of the chassis frame; each end is freely shackled to a perch attached to the upper side of the axle, the spring position being directly in line with the above axle. In order to maintain the correct relation of the axle to the frame, a radius rod is employed, made generally in the form of a wishbone; either end of the radius rod is rigidly attached to the front axle at the point where the perches are located; the rear end formed by the meeting of the "legs" is arranged as a ball, and held in a ball socket at the forward side of the motor flywheel case. The radius rod prevents the front axle from being forced back when the wheels come in contact with road obstructions; it also tends to prevent the chassis from swinging sidewise in relation to the front axle. This latter function cannot be performed because of the long length of the "legs" of the radius rods, and the wear and loosening up of the fastenings of this front system. The steering arm drag link attaches to the steering arm and knuckle arm through ball sockets. It is arranged across the car nearly parallel with the front axle, the steering arm at the lower end of the steering gear, supporting the chassis frame, is located at the left side of the car and the drag link running across to the right hand knuckle arm. The throw, therefore, of the steering arm is crosswise in relation to the front and the rear of the chassis frame. Any change in relationship between the front axle and the chassis frame, through the freely shackled spring ends, changes the direction of the front wheels, through the push and pull of the steering arm on the drag link without the assistance of the operator at the steering wheel. In turning a right corner, the operator turns the steering wheel to the right, which turns the front wheels to the right and the car starts to turn. However, the tendency of the car is not to turn but to continue in a straight line, and the strain brought on the radius rods, attempting to change the relative position of the front axle and the chassis frame permitting the chassis frame to take a position relative to the left of its previous location and carrying with it the steering arm, which in turn pulls on the knuckle arm and steers the front wheel more to the right than the operator desires, causing him to rectify this condition by turning the steering wheel to the left. It can be seen that in turning to the left, the tendency is for the wheels to turn more to the left than the operator desires. These same conditions exist in driving straight ahead. In dodging holes, and snow, or ruts, the car will begin to sway from side to side and cause the above peculiar steering action. The higher the car speed, or the greater the load, the more pronounced this action becomes, constituting a real danger. The object of this invention, presently described in detail, is to eliminate the above steering weakness, without interfering with the free resilient action of the front spring, nor adding to the power necessary to steer the car, on the contrary, to assist in permitting free spring action thus saving the strength of the operator of the car by eliminating such constant watchfulness and quick action at the steering wheel to counteract or overcome the aforementioned conditions.

The front axle 10 of a Ford automobile is connected by the perches 11 and shackles 12 with the free ends of a leaf spring 13 attached at its middle by a clip 14 to the front crossbar 15 of the chassis frame. The middle of the front axle 10 is connected with the middle of the crossbar 15 of the chassis frame by an alinement device 20 arranged to maintain the relationship of the front axle with the front of the chassis frame in such a manner that the middle of the axle 10 and the middle of the crossbar 15 always approach each other along a line at right angles to the middle of either the axle 10 or the front crossbar 15.

The alinement device 20 consists essentially of a hinge having an upper leaf 21 and a lower leaf 22, the leaves being pivotally connected with each other by a transversely extending pintle 23. The upper end of the upper leaf 21 is connected by a transverse pintle 24 with an eye 25 formed on the rear edge of the clip plate 26 of the clip 14 used for connecting the leaf spring 13 with the crossbar 15, as previously mentioned. The lower end of the lower leaf 22 is connected by a transverse pintle 30 with an eye 31 formed on the upper end of an eye plate 32 connected by a longitudinally extending pivot 33 with a supporting plate 34, preferably in the form of an angle iron fastened by clips 35 at the front axle 10. The axis of the pivot 33 is at the middle of the axle 10.

It will be noticed that by the arrangement described a hinged connection is had between the front axle 10 and the front crossbar 15 of the chassis frame to allow an up and down movement of the axle 10 and front crossbar 15 of the chassis, one relative to the other, at the same time allowing the front axle 10 to rock on the pivot 33 when the wheels travel over uneven ground, thus preventing sidewise movement of the front axle 10 relative to the chassis frame to stop side swaying.

It will be noticed that the alinement device shown and described can be readily attached to an automobile of the type described without requiring alteration in the construction of such automobile.

Having thus described my invention, I claim as new and desire to secure by Letters Patent:—

1. In an automobile of the type described, an articulated alinement device connecting the chassis frame with the front axle at the middle thereof, the alinement device having a transverse pivotal connection with the chassis frame and the front axle being mounted to rock on the alinement device in a vertical transverse plane.

2. In an automobile of the type described, an alinement device comprising a hinge having one of its leaves pivotally connected with the chassis of the automobile to swing up and down and having its other leaf pivotally connected with the front axle of the automobile to swing sidewise.

3. In an automobile of the type described, an alinement device comprising a hinge having an upper member, a lower member, and a transverse pintle connecting the leaves with each other, a pivotal connection connecting the upper end of the said upper leaf with the chassis of the automobile, the axis of the pivotal connection being transverse to the longitudinal central line of the chassis, and a pivotal connection connecting the lower end of the said lower leaf with the front axle of the automobile and having its axis at a right angle to the said front shaft.

4. In an automobile of the type described, an alinement device, comprising a hinge having an upper leaf, a lower leaf and a transverse pintle connecting the leaves with each other, a clip having a clip plate provided with an eye, the clip connecting the middle of the front spring of the automobile with the chassis, a transverse pintle pivotally connecting the upper end of the said upper leaf with the said eye, an eye plate pivotally connected with the lower end of the said lower leaf, a supporting member, a clip fastening the said supporting member to the front axle, and a pivot connecting the said eye plate with the said supporting member, the pivot being at an angle to the front axle.

CLIFFORD S. PEETS.